March 10, 1953 — R. F. PRIBIL ET AL — 2,630,988
AERODYNAMIC BALANCE CONTROL
Filed Feb. 21, 1950 — 3 Sheets-Sheet 1
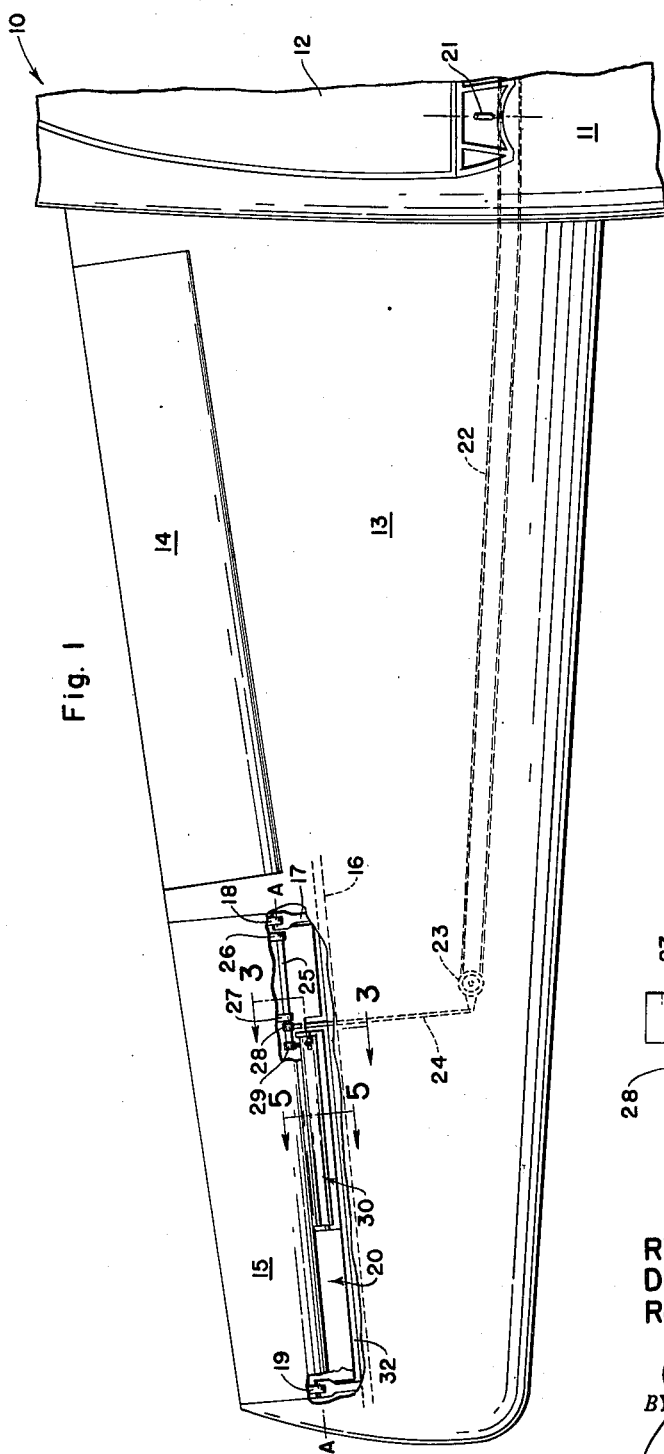
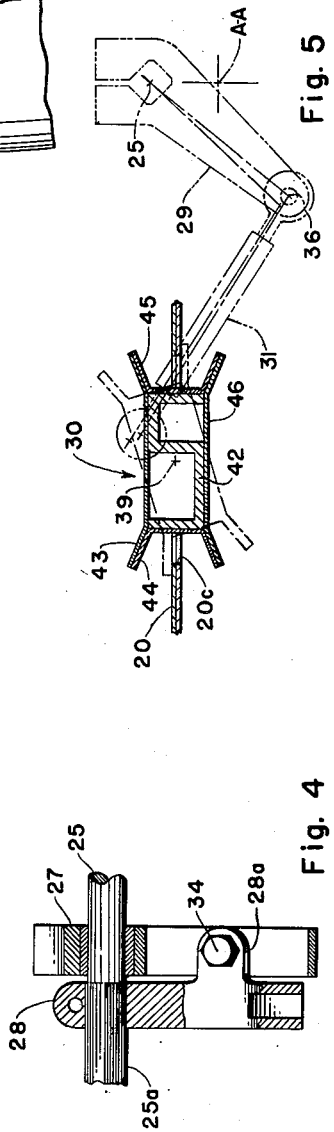
Richard F. Pribil
Dale D. Myers &
Ralph B. Schreiber
INVENTOR.
BY James M. Clark
THEIR PATENT ATTORNEY.

March 10, 1953 R. F. PRIBIL ET AL 2,630,988
AERODYNAMIC BALANCE CONTROL
Filed Feb. 21, 1950 3 Sheets-Sheet 2
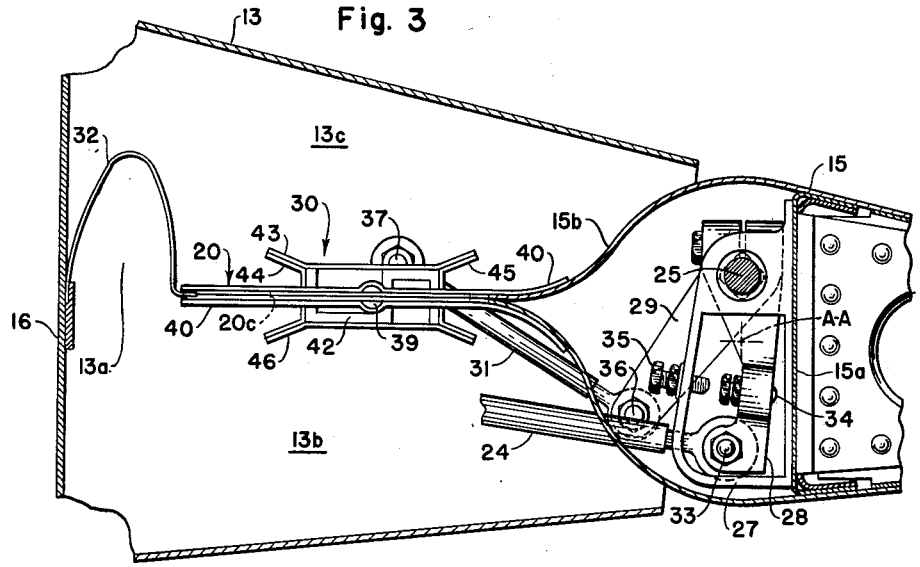
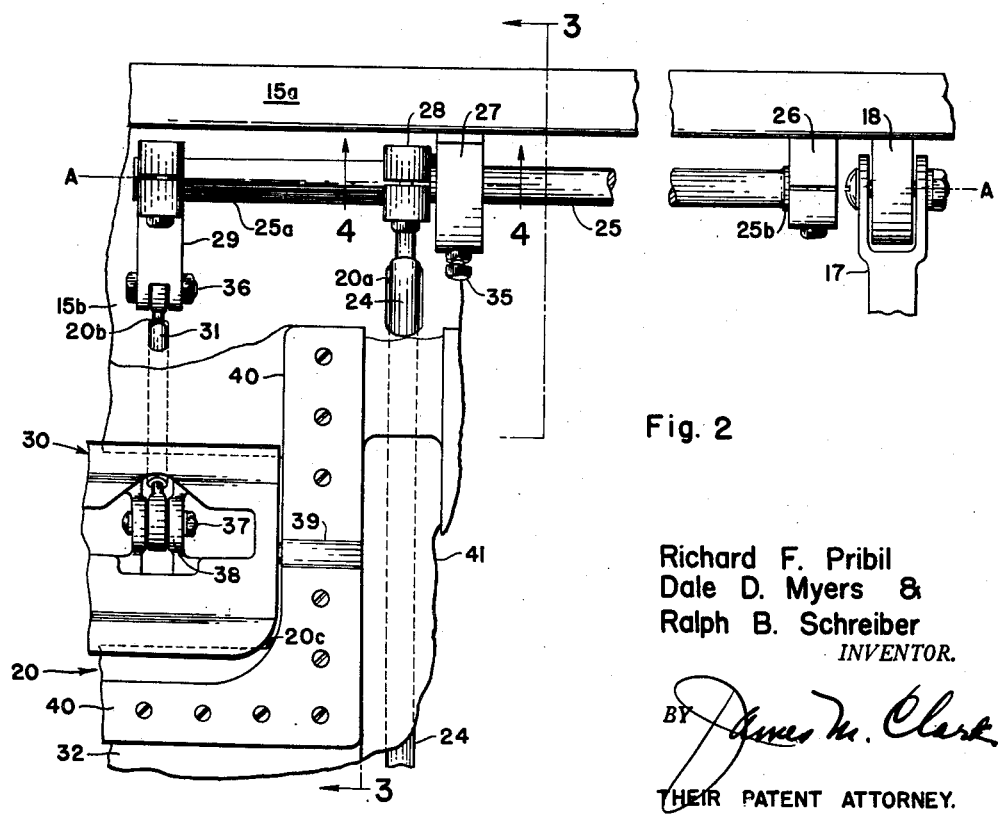
Richard F. Pribil
Dale D. Myers &
Ralph B. Schreiber
INVENTOR.
BY James M. Clark
THEIR PATENT ATTORNEY.

Richard F. Pribil
Dale D. Myers &
Ralph B. Schreiber
INVENTOR.

BY James M. Clark
THEIR PATENT ATTORNEY.

Patented Mar. 10, 1953

2,630,988

UNITED STATES PATENT OFFICE 2,630,988

AERODYNAMIC BALANCE CONTROL

Richard F. Pribil, Palos Verdes Estates, Dale D. Myers, Inglewood, and Ralph B. Schreiber, Los Angeles, Calif., assignors to North American Aviation, Inc.

Application February 21, 1950, Serial No. 145,346

10 Claims. (Cl. 244—90)

This invention relates generally to controls and control surfaces, and more particularly to improvements in means for operating controls and aerodynamically balancing control surfaces in aircraft and other vehicles.

The control or pilot force necessary to displace control surfaces from their neutral positions increases materially with the angle of their displacement, particularly in large or high speed aircraft. A number of different means has been proposed and utilized for assisting the pilot in overcoming the aerodynamic forces to which these displaced surfaces are subjected and among the most advantageous and successful of these are the internal pressure balance arrangements of the aerodynamic balance type in which sealed pressure chambers are provided, usually between the nose of the movable surface and the rear portion of the airfoil or wing upon which the surface is mounted. Partitioning means such as a balance paddle carried by the surface aids in creating a pressure differential between the upper and lower chambers which when utilized to assist in the displacement of the control surface materially relieves the strain upon the pilot, as well as upon the actuating mechanism within the control system. The present invention relates to improvements in aerodynamic balancing means of the internal pressure balance type and derives several advantageous and desirable results which such pressure balances have not heretofore afforded.

One form of the present invention comprises essentially an adjustable valve means disposed within the balance paddle or nose portion partitioning means of the movable surface in conjunction with a torque means interposed between the surface actuating mechanism and the control surface. The valve means is normally open when the surface is in its neutral position and remains open for the porting or venting of the chambers while the loads necessary to displace the surface are relatively light. Under higher load conditions, however, the pilot effort or the control force necessary to displace the movable surface causes torsional deflection or twisting of the torque means, which may be a rod, tube or spring, which force is transmitted mechanically to the valve means; the latter is then partially closed such that the resulting aerodynamic pressure differential created on the opposite sides of the balance paddle assists the pilot in displacing the surface in the desired direction. An advantageous feature of such an arrangement is the reduction in the control stick forces at high rates of airplane roll and their increase at lower rates of roll as compared to those obtained by prior movable surface controls. The present improvement also obtains very desirable pilot control forces as a function of pilot's effort by controlling the aerodynamic forces on the aerodynamic balance of a control surface.

It is, accordingly, a primary object of the present invention to provide improved means for the aerodynamic balancing of control surfaces and for overcoming the difficulties which are frequently presented by aerodynamic balancing arrangements. It is a further object to provide an improved form of aerodynamic internal pressure balance embodying a by-pass or metering valve means for controlling the desired balancing effect. A further object of the present invention resides in the provision of a torque bar or torsional spring means which is disposed within the surface actuating mechanism and is subject to torsional deflection or twisting under the varying pilot forces which are applied to the control surface.

A further object lies in the provision of an improved aerodynamic balance arrangement in which the deflection of the torque element is transmitted to the valve means for controlling the flow from one side of the balance paddle to the other to assist in obtaining more desirable pilot control force application as a function of pilot effort by controlling the aerodynamic forces on the aerodynamic balance of the control surface. A further object of the present invention is the provision of means to reduce the control stick or pilot forces at high rates of airplane roll and to increase these forces at much lower rates of roll than those heretofore obtained by other known control surface balancing systems.

Other objects and advantages of the present invention will become apparent to those skilled in the art to which the present invention relates after reading the following description, in conjunction with the accompanying drawings forming a part hereof, in which:

Fig. 1 is a plan view of an airplane wing having an aileron control surface to which a form of the improved mechanism of the present invention has been applied;

Fig. 2 is an enlarged plan view of a portion of the wing and aileron structure shown in Fig. 1, with the improved mechanism shown in greater detail;

Fig. 3 is a sectional elevation taken along the lines 3—3 of Fig. 2 showing the same mechanism;

Fig. 4 is a sectional elevation taken along the lines 4—4 of Fig. 2 showing certain of the torque bar support and attachment details;

Fig. 5 is a sectional elevation of the valve means shown in Figs. 1, 2 and 3;

Figure 7:
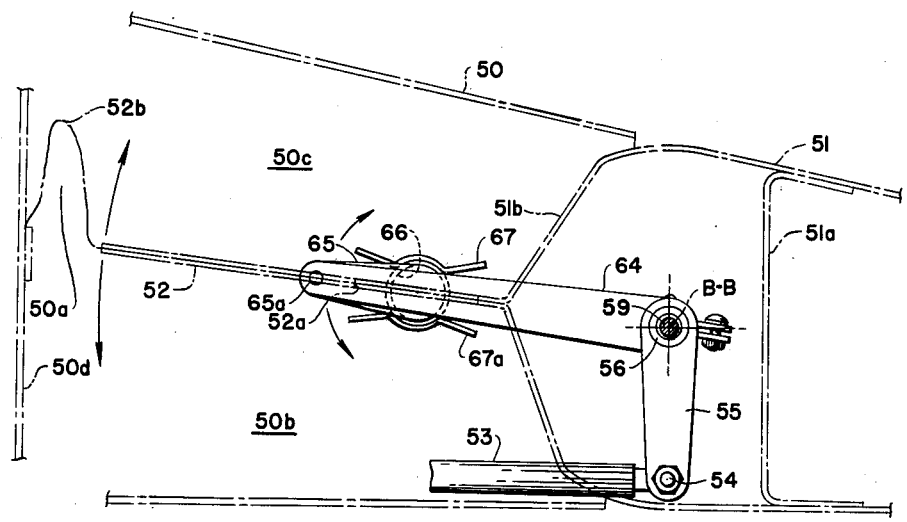
Fig. 7 is a sectional elevational view of the mechanism of Fig. 6 as taken along the lines 7—7 thereof.

Referring now to Fig. 1 the numeral 10 indicates fragmentarily an airplane having a fuselage 11 and a cockpit 12 for the pilot and other occupants. The airplane 10 is provided with laterally extending wings 13, of which but one is shown, with the trailing edge of which are associated the flap 14 and the aileron 15, for the lateral control of the craft. The wing 13 is provided with a spanwise extending rear spar 16 to which are attached the brackets 17 for the support of the aileron hinge members 18 and 19, having a hinge axis A—A about which the surface is pivotally rotated. Forward of the normal leading edge of the aileron 15 it is provided with the balance paddle or vane portion 20 for the known purpose of partitioning the chamber 13a creating a pressure differential between its upper and lower surfaces by virtue of the aerodynamic forces to which the deflected aileron 15 is subjected. The spar 16 forms the forward wall of a pressure chamber or compartment 13a which is divided into upper and lower chambers 13c and 13b, respectively, by the balance paddle 20 which accordingly serves as a partitioning member. The aileron 15 is operated by means of the control stick 21, located in the pilot compartment 12, connected to the control cable 22 which is preferably locked to the levered sheave member 23 for the fore and aft displacement of the push-pull rod 24. The aft terminal of the push-pull rod 24 is connected to the torque bar 25, fixedly supported and attached to the aileron by the fitting 26, and guided at the bearing fitting 27, being attached to the rod 24 by means of the attachment lever 28. The torque bar is preferably of metal or other resilient material and is shown as a solid rod of circular cross-section, but may be of other cross-section or tubular, or may even be a torsion spring, as long as it is capable of torsional resilience. The torque bar 25 is fixed at its inboard end by the fitting 26 and its outboard end is free in the torsional sense to be twisted by the push-pull rod 24 and its connection to the torque bar 25 through the attachment lever 28. The free outer end of the torque bar 25 is provided with an attachment lever 29 which is connected to the valve 30 for the opening 20c in the balance paddle portion 20 of the aileron 15 sealed from the spar 16 by the curtain 32.

Referring now to Figs. 2 to 5, inclusive, for a clearer understanding of the details of the arrangement shown in Fig. 1, it will be noted that the push-pull rod 24 extends rearwardly and downwardly through the slot or clearance opening 20a in the balance paddle 20. The rear terminal of the push-pull rod 24 is pivotally connected by means of the pivot 33 to the lever member 28 which is securely clamped about the squared portion 25a of the torque bar 25. The fitting 28 has an ear or laterally extending lug portion 28a within which the adjustment screws 34 are threadedly mounted and this projecting portion and the screws 34 operate within the opening in the adjoining bearing fitting 27. This fitting 27 is secured to the main spar 15a of the aileron 15, and its upper portion provides a bearing support for the rounded portion of the torque bar 25.

In Figs. 2 and 3 the hinge axis of the aileron 15 is also indicated by the lines A—A, this axis being disposed substantially beneath that of the torque bar 25, and as shown in Fig. 3, the axis A—A is intermediate the torque bar axis and the pivotal connection of the push-pull rod 24 at the pivot pin 33. It will, accordingly, be seen that relative movement of the lever 28 with respect to the fixed bearing fitting 27 about the axis of the torque bar 25 is limited by the adjustable screws 34 and 35, as shown in Fig. 3. The torque bar support fitting 26 is also clamped about a squared portion of the torque bar 25, as at 25b in Fig. 2, the fitting 26 being secured to the aileron spar 15a. The opposite or outboard end of the torque bar 25, which is also squared as at 25a from the fitting 26 outward, is clampingly engaged by the lever 29. The free end of the lever 29 is pivotally connected to the short link 31 by means of the pivot bolt 36 and the opposite terminal of the link 31, which passes through the opening 20b in the panel 20 and the aileron leading edge 15b, is pivotally connected to the adjustable valve structure 30 by means of the pivot bolt 37 engaging the bifurcated lugs or eyes 38. The gap or open area through the valve 30 adjacent the pivot bolt 37 and the lugs 38 may be suitably sealed to prevent the relatively small flow therethrough, although it has been found in a number of actual installations that this area represents such a negligible portion of the total area of the balance paddle that the slight reduction in stick forces which were obtained at the pressure differentials developed did not warrant complete sealing of this gap.

The adjustable valve 30 is mounted for limited rotation within the substantially rectangular opening 20c within the balance paddle 20, being rockable about the end pivot mountings 39, the axis of which extends spanwise of the wing substantially parallel to that of the torque bar 25. The pivotal mountings 39 are formed by the reinforcing plates 40 secured to the upper and lower faces of the balance paddle 20 which is also orificed or cut away and is provided with a flexible seal 41 for protrusion of the push-pull rod 24 through the balance paddle while the latter is deflected downwardly as the aileron proper is deflected upwardly about its hinge axis A—A. The valve 30 is formed from a substantially S-shaped frame element 42, to the outer faces of which are attached the channel-shaped valve plates 43, 44, 45 and 46. As may be seen in Fig. 5, rocking of the valve assembly 30 about the axis of its pivotal mounting 39 causes closing of the orifice 20c in the panel 20 by engagement of the valve plate 44 with the upper surface of the panel 20 at the leading side of the valve and engagement of the undersurface of the panel by the valve plate 45 at the trailing side of the valve 30, as shown in the construction lines in Fig. 5.

The operation of the modification shown in Figs. 1 to 5, inclusive, is as follows: Referring to Fig. 1, in the event it is desired to move the aileron 15 downwardly by movement of the control stick toward the port or left side of the aircraft (toward the right of the reader of Fig. 1) such movement of the control stick 21 moves the cable 22, causing counterclockwise rotation of the levered sheave 23 and forward movement of the push-pull rod 24. Referring now more particularly to Figs. 2 and 3, forward movement of the rod 24 tends to rotate the lever 28 in the clockwise direction about the axis of the torque bar 25, while at the same time tending to rotate the aileron 15 downwardly or in the same clockwise direction. In operation under light loads, movement of the control stick in the cockpit 12 is transmitted through the cable system and the rod 24, acting upon the arm or lever 28 and tending to rotate the torque bar 25. Inasmuch as this torque bar is directly carried by the aileron structure at its terminal 25b by means of the bracket 26, the rotative force applied to the bar will tend to deflect surface 15 in the desired direction. Under such relatively light loads applied through the lever arm fitting 28 the torque bar 25 may rotate slightly (due to a relatively small torsional deflection) within the journal provided in the bearing or housing fitting 27, the loads being transmitted through substantially the entire torque bar 25 from the fitting 28 to its fixed anchorage to the aileron at the fitting 26. Under higher load conditions, which are met with at greater angular deflections, the initial effect of the pilot's effort will be to place a torque load upon the torque bar which is secured to the aileron 26, and since the aileron tends to resist deflection, due to the air forces directed against it, the torque bar will twist or torsionally deflect. This twisting or "winding" action is transmitted through the arm 29 and the link 31 to the valve assembly 30 installed in the balance paddle 20, imparting rotation to the valve in the counterclockwise direction about its pivotal axis at 39, and at least partially closing the vent opening 20c through the paddle.

It will be understood that, as the aileron is deflected downwardly, the pressure within the chamber 13a in the trailing portion of the wing 13 is increased beneath the paddle 20 and the curtain seal 32 in the lower chamber 13b, and the pressure above the paddle will be reduced within the upper chamber 13c. This creates a pressure differential such that the air within the lower chamber 13b endeavors to escape through the vent or port 20c within the paddle. As the lips 44 and 45 of the valve 30 approach and restrict the flow through the opening in the paddle 20, the aerodynamic balancing effect increases, since there is less opportunity for equalization of the pressures within the balance chambers 13b and 13c because of such restricted flow through the valve. In the event the loads become sufficiently high, the valve 20 will be fully closed as shown in Fig. 5, giving a completely sealed balance. At the point where the valve becomes closed, i. e., the stop 35 making contact (or 34 in the event the aileron is deflected upwardly) additional pilot effort is entirely directed to the aileron 15 through the bearing or housing fitting 27 secured to the front spar 15a of the aileron. As indicated above, the stops 34 and 35 are adjustable and may be set for any desired range of movement according to the control characteristics of the individual airplane.

Figure 6:
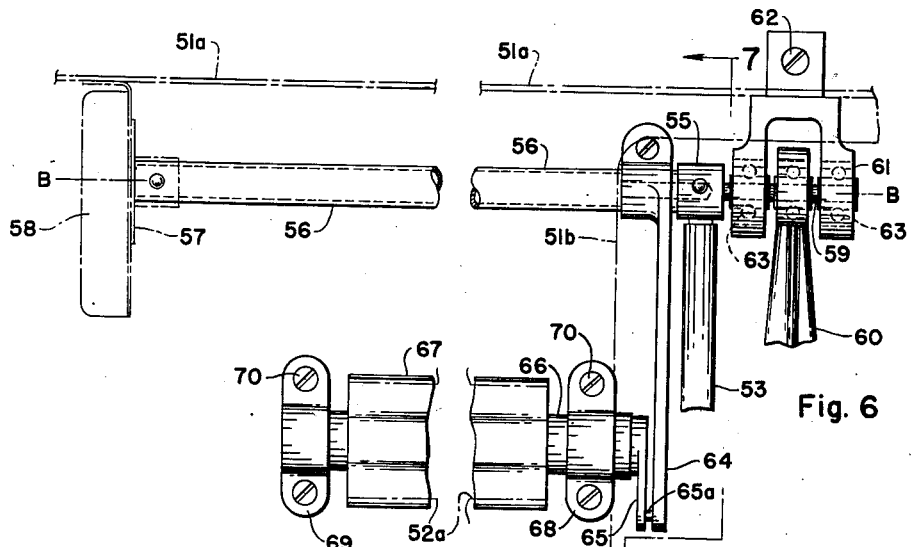
Fig. 6 is a plan view, corresponding to the plan view of Fig. 2, showing a modified form of the improved mechanism.

Referring now to the modification shown in Figs. 6 and 7, which is also applicable to an airplane as shown in Fig. 1, the wing is indicated by the numeral 50 and the aileron by the numeral 51. This modification differs essentially from that previously described in that the hinge axis of the aileron and the axis of the torsion tube coincide in the common axis B—B, whereas in the previous arrangement they were spaced vertically. Another difference lies in the construction of the tubular torque means. The aileron 51 is provided with a front spar 51a and has a leading edge 51b which extends forwardly to form the balance paddle 52. The wing 50 is provided with a trailing edge spar 50d and the intervening space between the spar 50d and the front edge of the paddle 52 is sealed by the flexible curtain 52b. A pressure compartment 50a is formed within the aft portion of the wing 50 and the paddle 52 divides this compartment into upper and lower chambers 50c and 50b, respectively. It will be understood that the aileron control surface 51 is supported from the rear spar 50d of the wing as by means of a plurality of the hinge brackets 60 upon which the aileron is mounted by the eye or hinge fitting 61 attached to the aileron as by the screws 62.

A push-pull rod 53, suitably interconnected within the control system to a control stick as in the case of the push-pull rod in Fig. 1, is pivotally connected to the arm or lever element 55 at the pivotal connection 54. The upper terminal of the lever 55 is attached to the free end of a tubular torque element 56 which is anchored to the aileron structure at its outer terminal as by the flanged fitting 57 and the bracket support 58 attached to the spar 51a of the aileron. The inboard or free end of the torque tube 56 is provided with a pin element 59 which is journalled within the aileron bracket 60 and the bearings 63 of its bifurcated hinge fitting 61. It will, accordingly, be seen that the axis of the torque tube 56 and the insert pin 59 coincides with that of the aileron hinge fitting, all being co-axial along the common axis B—B.

An arm 64 is also rigidly attached to the free end of the torque tube 56 at the portion wherein it is reinforced by the inserted pin element 59 and the outer end of the arm 64 is provided with a pivotal connection 65a to the lever 65. The latter is pivotally mounted to the valve pivot 66 of the valve assembly 67 within the pivot bearings 68 and 69 attached to the balance paddle 52 as by means of the screws 70. The valve assembly 67 is mounted within a rectangular opening or orifice 52a in the balance paddle in a similar manner to that of the previous modification and the valve is provided with similar lip portions 67a.

The operation of the modification shown in Figs. 6 and 7 is as follows: assuming that it is desired to lower the aileron 51 the control stick is moved such that the push-pull rod 53 is moved forward or to the left in Fig. 7, tending to rotate the lever arm 55 in the clockwise direction. In the event opposition to such downward deflection of the aileron 51 is relatively small, and the pilot force is commensurate with such a small load, the clockwise movement of the arm 55 will be transmitted directly to the aileron 51 by transmission without appreciable twisting, by the torque tube 56, its end flange 57 and the bracket 58. In the event deflection of the aileron could be continued indefinitely with the application of such a small pilot force, as would be the case, for example, were the airplane to be at rest upon the ground, the valve actuating arm 64 would rotate as a unit with the arm 55 and the aileron 51; and since there would be no relative movement between the arm 64 and the paddle 52, the valve 67 would remain in its neutral wide-open position as shown in Fig. 7. However, such continued deflection of the ailerons during flight will meet with increased opposition to displacement against the air flowing past the wing, necessitating a greater control force which will cause "twisting" of the tubular torque member 56.

This will have the effect of causing the valve actuating arm 64 to move in the clockwise direction through a somewhat greater angle than the aileron 51 and its balance paddle 52, with the result that this differential movement, transmitted through the pin 65a and the lever 65, causes clockwise pivotation of the valve assembly 67 about its pivot mounting 66 and partial closing of valve opening 52a. The porting or venting of the valve is, accordingly, restricted as the lips of the valve assembly 67 approach the margins of the valve opening and the resulting increased pressure differential in favor of the lower chamber 50b assists the pilot or control force in rotating the aileron by the provision of an aerodynamic balance.

It will, accordingly, be noted that this arrangement provides an improved device for advantageous use on aerodynamic control surfaces, and obtains desirable pilot control forces as a function of the pilot effort by controlling the aerodynamic balance of the control surface. As described above, this is accomplished by the deflection of the torque means or the differential angular movement between the free and fixed ends of the torque tube 56 imparting the necessary movement and adjustment of the valve 57 which controls the aerodynamic forces on the aerodynamic balance by porting air from one side of the balance paddle to the other, or by shutting off the air flow completely. It will also be noted that a further desirable result of the presently described mechanism is the reduction in the control stick forces at high rates of airplane roll and their increase at lower rates of roll, the magnitude of which is lesser and greater, respectively, than that obtained by prior control surface controls. In constructions of the type disclosed herein, adequate clearance should be provided to permit unrestricted movement of the balance paddle particularly at the forward corners of the paddle and at its ends as well as to insure that the curtain or seal is also unrestricted as the aileron is deflected in either direction. A further advantage of the disclosed construction is that it also provides a relatively smooth transition from a maximum air leakage deflection or neutral position of the aileron, to the minimum leakage position at a predetermined angle of aileron deflection.

Other forms and modifications of the present invention which may occur to those skilled in the art after reading the present description are intended to come within the scope and spirit of this invention as more particularly set forth in the appended claims.

We claim:

1. In aircraft, an internal pressure balance comprising an airfoil, a pressure chamber formed within said airfoil, a control surface movably mounted upon said airfoil, said control surface having a pressure balance paddle sealingly fitted at its edges for movement within said pressure chamber of said airfoil, valve means carried by said balance paddle for control of air flow through said balance paddle from one side of said pressure chamber to the other, each side of said pressure chamber open to the adjacent exterior of said airfoil, and actuating mechanism for the operation of said control surface including a torsion element fixed at one terminal to said control surface, said torsion element having an opposite torsionally deflectable portion operatively associated with said valve means, said actuating mechanism including a manually operated element connected to said torsionally deflectable portion of said torsion element for adjustment of said control surface, whereby application of a manual control force to said manually operated element and deflection of said torsion element initiates actuation of said valve means for producing a balance effect by creating a pressure differential of said airflow on opposite sides of said balance paddle by the actuation of said valve means in accordance with the magnitude of the manual control force applied to said actuating means required to displace said control surface by the deflection of said torsion element.

2. In aircraft, an internal pressure balance including an airfoil, a pressure chamber formed within said airfoil, a control surface operatively mounted upon said airfoil, said control surface having a partitioning element sealingly fitted at its edges for movement within said pressure chamber, said partitioning element dividing said chamber into differential pressure portions each separately communicating with the exterior of said airfoil, variable orifice means carried by said partitioning element for varying the flow of air from one said pressure portion of said chamber to the other said pressure portion, manual actuating means including a push-pull rod and a lever for the operation of said control surface, a deflectable torque tube operatively connected between said actuating means and said control surface at oppositely spaced portions of said torque tube, mechanism connecting said torque tube with said variable orifice means for the varying of said variable orifice upon application of control forces to said actuating means and deflection of said torque tube to produce a balance effect in accordance with the force required by said actuating means to operate said control surface, and adjustable means including stop elements associated with said lever of said actuating means and said control surface engageable at a predetermined position of said variable orifice with respect to said control surface to cause said actuating means to directly operate said control surface through said engaged stop elements.

3. In aircraft, an internal pressure balance comprising an airfoil, a pressure chamber formed within said airfoil, a control surface movably mounted upon said airfoil, said control surface having a pressure balance paddle sealingly fitted at its edges for movement within said pressure chamber, said balance paddle dividing said chamber into differential pressure portions each separately communicating with the exterior of said airfoil, valve means operatively carried by said balance paddle for control of air flow from one portion of said pressure chamber to the other, torsion means having one terminal anchored to said control surface and an opposite deflectable terminal movable with respect to said control surface, actuating means connected to said deflectable terminal of said torsion means for moving said control surface, and operating means including a connection from said deflectable terminal of said torsion means to said valve means initiated by movement of said actuating means and deflection of said torsion means for adjusting said valve means for controlling said pressure differential for assisting said actuating means in moving said control surface.

4. In aircraft, an internal pressure balance comprising an airfoil, a pressure chamber formed within said airfoil, a control surface movably mounted upon said airfoil, said control surface having a pressure balance paddle sealingly fitted at its edges for movement within said pressure chamber, said balance paddle dividing said chamber into differential pressure portions each separately communicating with the exterior of said airfoil, valve means including an orifice through said balance paddle and a valve element pivotally carried by said balance paddle for control of air flow through said orifice in said balance paddle from one said pressure portion of said pressure chamber to the other said portion, actuating means for the operation of said control surface, a torque tube capable of torsional deflection operatively interconnecting said actuating means with said control surface, said torque tube having a free terminal attached to said actuating means and an opposite terminal attached to said control surface, and operating means operatively connecting said torque tube with said valve means initiated by the torsional deflection of said torque tube upon application of forces to said actuating means for the adjustment of said valve means to produce a balance effect by said balance paddle within said pressure chamber in accordance with the force required by said actuating means to move said control surface by torsionally deflecting said torque tube.

5. In aircraft, an internal pressure balance comprising an airfoil, a pressure chamber formed within said airfoil, a control surface movably mounted upon said airfoil, said control surface having a pressure balance paddle sealingly fitted at its edges for movement within said pressure chamber, said balance paddle dividing said chamber into differential pressure portions each separately communicating with the exterior of said airfoil, said balance paddle having an orifice therethrough, valve means pivotally carried by said balance paddle for control of air flow through said orifice from one portion of said pressure chamber to the other, and actuating means including a deflectable torque element for moving said control surface, said deflectable torque element having a first terminal anchored to said control surface and an oppositely disposed deflectable terminal connected to said valve means and to said actuating means, said torque element connected to said actuating means, said control surface and said valve means in such manner that movement of said actuating means and deflection of said torque element initiates adjustment of said valve means controlling said orifice and the pressure differential across said balance paddle for assisting said actuating means in moving said control surface.

6. In aircraft, an internal pressure balance including an airfoil, a pressure chamber formed within the trailing portion of said airfoil, a control surface operatively mounted upon said airfoil, said control surface having a partitioning element sealing fitted at its edges for relatively air-tight movement within said pressure chamber, said partitioning element dividing said chamber into differential pressure portions each separately communicating with the exterior of said airfoil, variable orifice means carried by said partitioning element for varying the flow of air from one said pressure portion of said chamber to the other said portion, actuating means for the operation of said control surface, and torque means including a torsionally resilient element operatively connecting said actuating means with said control surface, said torsionally resilient element having a relatively fixed portion attached to said control surface and a relatively movable portion operatively connected to said actuating means and to said variable orifice means, arranged in such manner that application of control force to said actuating means and torsional deflection of said torsionally resilient element causes varying of said variable orifice means carried by said partitioning element to produce a balance effect upon said partitioning element in accordance with the force required by said actuating means to operate said control surface as reflected by the torsional deflection of said resilient element.

7. In an internal pressure balance for an aircraft including an airfoil, a pressure chamber formed within the trailing portion of said airfoil, a control surface operatively mounted upon said airfoil, actuating means including a push-pull rod for the operation of said control surface, and a partitioning element carried by said control surface sealingly fitted at its edges for movement in a relatively air-tight manner throughout its movement within said pressure chamber, said partitioning element dividing said chamber into differential pressure portions each separately communicating with the exterior of said airfoil, the improvement comprising variable orifice means carried by said partitioning element varying the flow of air from one said pressure portion of said chamber to the other said portion, and deflectable torque means operatively connected between said push-pull rod of said actuating means and said control surface, said torque means having a fixed portion connected to said control surface, said torque means having a deflectable portion eccentrically connected to said actuating means and an adjacent deflectable portion connected to said variable orifice means, application of control surface operating forces to said actuating means initiating deflection of said torque means and operation of said variable orifice means to produce a balanced effect in accordance with the force required by said actuating means to operate said control surface irrespective of the position of said control surface with respect to said airfoil.

8. In an aircraft, an internal pressure balance including an airfoil, a pressure chamber formed within the trailing portion of said airfoil, a control surface operatively mounted upon said airfoil, said control surface having a partitioning element sealingly fitted at its edges for relatively air-tight movements within said pressure chamber, said partitioning element dividing said chamber into differential pressure portions each separately communicating with the exterior of said airfoil, variable orifice means carried by said partitioning element for varying the flow of air from one said pressure portion of said chamber to the other said portion, and actuating means for the operation of said control surface, including a torsionally deflectable element operatively connected at a fixed portion of said deflectable element to said control surface, said deflectable element connected at a deflectable portion to said variable orifice means whereby movement of said actuating means for operation of said control surface and torsional deflection of said deflectable element causes closing movement of said variable orifice means proportional to deflection of said torsionally deflectable element to produce a pressure balance effect across said partitioning element.

9. In an internal pressure balance installation for an aircraft, the combination with an airfoil, a pressure chamber formed within said airfoil, a control surface movably mounted upon said airfoil, said control surface having a pressure balance paddle sealingly fitted at its edges for movement within said pressure chamber, said balance paddle dividing said chamber into differential pressure portions each separately communicating with the exterior of said airfoil, said balance paddle having an orifice therein, a valve element pivotally carried by said balance paddle for control of air flow through said orifice in said balance paddle from one said pressure portion of said pressure chamber to the other said portion, and an actuating element connected for the operation of said control surface, of torque means capable of torsional deflection operatively interconnecting said actuating means with said control surface, and operating means connecting a torsionally deflectable portion of said torque means initiated by the application of a control force to said actuating element and the torsional deflection of said torque means for regulation of said valve element to produce a balanced effect as a function of the force required by said actuating element to move said control surface.

10. In aircraft, an internal pressure balance including an airfoil, a pressure chamber formed within said airfoil, a control surface movably mounted upon a spanwise axis supported from said airfoil, said control surface having a pressure balance paddle sealingly fitted at its edges for movement within said pressure chamber, said balance paddle dividing said chamber into differential pressure portions each separately communicating with the exterior of said airfoil, valve means including an orifice through said balance paddle and a valve element pivotally carried by said balance paddle for control of air flow through said orifice in said balance paddle from one said pressure portion of said pressure chamber to the other said portion, actuating means for the operation of said control surface including a torsion tube having an axis disposed in alignment with the axis of said control surface, said torsion tube operatively interconnecting said valve means with said control surface at longitudinally spaced and relatively deflectable points along the axis of said torsion tube, one of said spaced points fixed to said control surface and manually operated means for applying a control force eccentrically of said torsion tube axis at the other deflectable point thereon for operating said control surface to thereby initiate the adjustment of said valve means to produce a pressure balanced effect in said pressure portions in accordance with the pilot force required by said actuating means to move said control surface by torsionally deflecting said torque tube.

RICHARD F. PRIBIL.
DALE D. MYERS.
RALPH B. SCHREIBER.

REFERENCES CITED

The following references are of record in the file of this patent:

UNITED STATES PATENTS

| Number | Name | Date |
|---|---|---|
| 2,368,059 | White | Jan. 23, 1945 |
| 2,370,844 | Davis | Mar. 6, 1945 |

FOREIGN PATENTS

| Number | Country | Date |
|---|---|---|
| 441,603 | France | May 30, 1912 |
| 491,538 | Great Britain | Sept. 5, 1938 |